(12) United States Patent
Takeuchi

(10) Patent No.: US 10,016,687 B2
(45) Date of Patent: Jul. 10, 2018

(54) GAME SYSTEM, SERVER DEVICE, CONTROL METHOD FOR SERVER DEVICE, PROGRAM, AND INFORMATION RECORDING MEDIUM

(71) Applicant: KONAMI DIGITAL ENTERTAINMENT CO., LTD., Tokyo (JP)

(72) Inventor: Yoji Takeuchi, Yokohama (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 958 days.

(21) Appl. No.: 14/388,241

(22) PCT Filed: Mar. 22, 2013

(86) PCT No.: PCT/JP2013/058257
§ 371 (c)(1),
(2) Date: Sep. 26, 2014

(87) PCT Pub. No.: WO2013/146577
PCT Pub. Date: Oct. 3, 2013

(65) Prior Publication Data
US 2015/0050985 A1 Feb. 19, 2015

(30) Foreign Application Priority Data

Mar. 29, 2012 (JP) .................................. 2012-077185

(51) Int. Cl.
*A63F 13/63* (2014.01)
*A63F 13/822* (2014.01)
*A63F 13/812* (2014.01)

(52) U.S. Cl.
CPC .......... *A63F 13/822* (2014.09); *A63F 13/812* (2014.09); *A63F 2300/403* (2013.01); *A63F 2300/575* (2013.01); *A63F 2300/8011* (2013.01)

(58) Field of Classification Search
CPC .................. A63F 13/822; A63F 13/812; A63F 2300/575; A63F 13/847; A63F 13/87; A63F 13/335; A63F 2300/407
See application file for complete search history.

(56) References Cited

U.S. PATENT DOCUMENTS 6,676,521 B1 * 1/2004 La Mura ................. A63F 13/12
463/42
2012/0064969 A1 3/2012 Uchibori

FOREIGN PATENT DOCUMENTS

JP 2004-097269 A 4/2004
JP 2004-167172 A 6/2004
(Continued)

OTHER PUBLICATIONS

English Translation of Written Opinion of the International Searching Authority for PCT/JP2013/058257 accompanied with PCT/IB/373 dated Oct. 1, 2014.

*Primary Examiner* — Jay Liddle
*Assistant Examiner* — Alex F. R. P. Rada, II
(74) *Attorney, Agent, or Firm* — HEA Law PLLC

(57) ABSTRACT

A game system for allowing a user to feel as if the user supports a match game is provided. The game system executes the match based on a plurality of items of game data. Support operation receiving means receives, at least either one of prior to and during the match, a support operation for the plurality of items of game data from a plurality of users. Game parameter changing means for changing a game parameter relating to a match result of the match based on the support operation for the plurality of (Continued)

items of game data so as to make at least one of the plurality of items of game data more advantageous or disadvantageous than before receiving the support operation. Reward providing means provides a reward to a user who has performed the support operation based on the match result of the match.

11 Claims, 12 Drawing Sheets

(56) References Cited

FOREIGN PATENT DOCUMENTS

| | | |
|---|---|---|
| JP | 2007-061472 A | 3/2007 |
| JP | 2007-313017 A | 12/2007 |
| JP | 2012-061060 A | 3/2012 |

\* cited by examiner

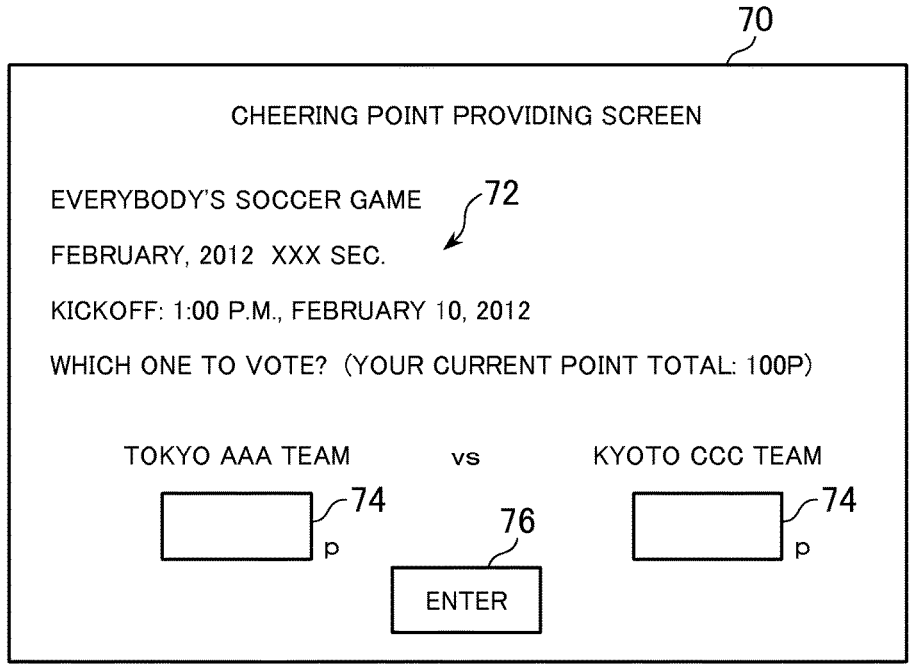
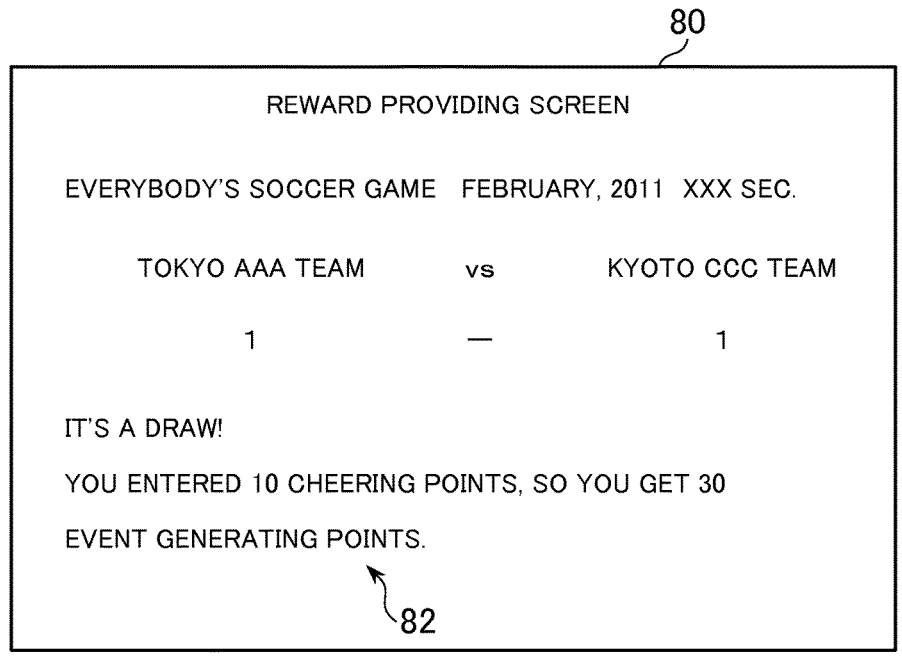

FIG.9

| TOKYO AAA TEAM |
|---|
| KYOTO CCC TEAM |
| . |
| . |
| . |

FIG.10

| SUPPORT AMOUNT | REWARD CONTENT |
|---|---|
| ~5 | 10 |
| 5~10 | 30 |
| . | . |
| . | . |
| . | . |

FIG.12

| EVERYBODY'S SOCCER TEAM NAME | PLAYER | MATCH RESULT | |
|---|---|---|---|
| TOKYO AAA TEAM | ・・・ | THIRD | 5 WINS/0 LOSE/1 DRAW |
| KYOTO CCC TEAM | ・・・ | SEVENTH | 3 WINS/1 LOSE/2 DRAWS |

FIG.13

| MATCH PAIRING DATA | DATE AND TIME DATA | SUPPORT STATUS DATA |
|---|---|---|
| TOKYO AAA TEAM vs KYOTO CCC TEAM | 1:00 P.M., FEBRUARY 10, 2012 | USER A, TOKYO AAA TEAM, 10P |

GAME SYSTEM, SERVER DEVICE, CONTROL METHOD FOR SERVER DEVICE, PROGRAM, AND INFORMATION RECORDING MEDIUM

CROSS REFERENCE TO RELATED APPLICATIONS

This application is a National Stage of International Application No. PCT/JP2013/058257 filed on Mar. 22, 2013, claiming priority based on Japanese Patent Application No. 2012-077185 filed on Mar. 29, 2012. The contents of each of the above documents are incorporated herein by reference in their entirety.

TECHNICAL FIELD

The present invention relates to a game system, a server device, a control method for the server device, a program, and an information recording medium.

BACKGROUND ART

A game system for executing a match game is known in the art. Patent Literature 1 describes a game system for executing a match game in which a user predicts the winner of the match game, and a point is given to the user according to the result of the match game.

CITATION LIST

Patent Document

Patent Literature 1: JP2007-61472A

SUMMARY OF INVENTION

Technical Problem

However, in accordance with Patent Literature 1, the user only predicts the winner of the match game, and such prediction has no influence on the result of the match game regardless of which player is predicted by the user to win. As such, the user could not experience the feeling as if the user supports the match game.

One or more embodiments of the present invention have been conceived in view of the above, and an object thereof is to provide a game system, a server device, a method for controlling the server device, a program, and an information storage medium for allowing a user to feel as if the user supports a match game.

Solution to Problem

In order to solve the above described problems, a game system according to the present invention executes a match based on a plurality of items of game data and includes support operation receiving means for receiving, at least either one of prior to and during the match, a support operation for the plurality of items of game data from a plurality of users, game parameter changing means for changing a game parameter relating to a match result of the match based on the support operation for the plurality of items of game data so as to make at least one of the plurality of items of game data more advantageous or disadvantageous than before receiving the support operation, and reward providing means for providing a reward to a user who has performed the support operation based on the match result of the match.

A server device according to the present invention executes a match based on a plurality of items of game data, and includes support operation receiving means for receiving, at least either one of prior to and during the match, a support operation for the plurality of items of game data from a plurality of users, game parameter changing means for changing a game parameter relating to a match result of the match based on the support operation for the plurality of items of game data so as to make at least one of the plurality of items of game data more advantageous or disadvantageous than before receiving the support operation, and reward providing means for providing a reward to a user who has performed the support operation based on the match result of the match.

A method for controlling a server device, which executes a match based on a plurality of items of game data, according to the present invention, includes the steps of receiving, at least either one of prior to and during the match, a support operation for the plurality of items of game data from a plurality of users, changing a game parameter relating to a match result of the match based on the support operation for the plurality of items of game data so as to make at least one of the plurality of items of game data more advantageous or disadvantageous than before receiving the support operation, and providing a reward to a user who has performed the support operation based on the match result of the match.

A program according to the present invention causes a computer, which executes a match based on a plurality of items of game data, to function as support operation receiving means for receiving, at least either one of prior to and during the match, a support operation for the plurality of items of game data from a plurality of users, game parameter changing means for changing a game parameter relating to a match result of the match based on the support operation for the plurality of items of game data so as to make at least one of the plurality of items of game data more advantageous or disadvantageous than before receiving the support operation, and reward providing means for providing a reward to a user who has performed the support operation based on the match result of the match.

An information storage medium according to the present invention is a computer-readable information storage medium for storing the above described program.

According to the present invention, a user can feel as if the user supports a match game.

In an embodiment of the present invention, in the game system, a first match is executed in the game system based on the plurality of items of game data. The game system includes second match executing means for executing a second match based on game data of at least two users of the plurality of users, and support operation permitting means for permitting the users who have played in the second match to perform the support operation based on a match result of the second match. The support operation receiving means receives the support operation for the plurality of items of game data from the user who is permitted to perform the support operation at least one of either prior to and during the first match. The reward providing means provides a reward to the user who has performed the support operation based on a match result of the first match.

In an embodiment of the present invention, the first match is a match relating to a competition of a real world or a virtual world. The game system further includes means for obtaining data relating to a plurality of competition players or a plurality of competition teams of the real world or the virtual world, means for obtaining match pairing data relating to a match pairing of the competition of the real world or the virtual world, means for associating each of the plurality of users with at least one of the plurality of competition teams or the plurality of competition players, and means for determining the match pairing of the second match or a plurality of candidates of the match pairing of the second match such that the paring of the competition teams or the competition players, which are associated with respective users who play in the second match, corresponds to the match pairing of the competition of the real world or the virtual world. The second match executing means executes the second match based on the determined match pairing of the second match or the match pairing selected from the candidates of the match pairing of the second match.

In an embodiment of the present invention, the first match is a match relating to a competition of a real world or a virtual world. The game system further includes means for obtaining data relating to a plurality of competition players or a plurality of competition teams of the real world or the virtual world, means for obtaining match pairing data relating to a match pairing of the competition of the real world or the virtual world, means for associating each of the plurality of users with at least one of the plurality of competition teams or the plurality of competition players, means for receiving, from at least one of the plurality of users, a selection of the other user to be an opponent in the second match, before the execution of the second match, and comparing means for comparing the paring of the competition teams or the competition players, which are associated with the respective users who play in the second match, with the match pairing of the real world or the virtual world in a case where the second match is executed. The support operation permitting means permits the user who has played in the second match to perform the support operation based on a comparison result of the comparing means and a match result of the second match.

In an embodiment of the present invention, the first match is a match relating to a competition of a real world or a virtual world. The game system further includes means for storing date and time data relating to a date and time of the match of the real world or the virtual world, means for restricting the second match to be executed by the second match executing means, and means for releasing a restriction of the second match during a term corresponding to the date and time indicated by the date and time data.

In an embodiment of the present invention, the first match is a match relating to a competition of a real world or a virtual world. The game system includes means for storing date and time data relating to a date and time of the match of the real world or the virtual world, and determining means for determining whether or not the second match is executed by the second match executing means during a term corresponding to the date and time indicated by the date and time data. The support operation permitting means permits the user who has played in the second match to perform a support operation based on a determination result of the determining means and a match result of the second match.

In an embodiment of the present invention, the game system further includes means for obtaining a support amount of the plurality of items of game data, means for obtaining data from means for storing data in which the support amount is associated with a changed amount of the game parameter. The game parameter changing means includes means for obtaining the changed amount of the game parameter associated with the support amount of the plurality of items of game data, and changes the game parameter based on the obtained changed amount.

In an embodiment of the present invention, the game system further includes means for obtaining a support amount of the plurality of items of game data, and comparing means for comparing the support amount of the respective plurality of items of game data. The game parameter changing means changes the game parameter based on a comparison result of the comparing means.

In an embodiment of the present invention, the game system further includes means for obtaining a support amount of the plurality of items of game data, and means for obtaining data from means for storing data in which the support amount is associated with content of the reward to be provided to the user. The reward providing means includes means for obtaining the content of the reward associated with the support amount of the plurality of items of game data, and provides the obtained content of the reward to the user who has performed the support operation to the plurality of items of game data.

BRIEF DESCRIPTION OF DRAWINGS

FIG. 6 A figure showing an example of a cheering point providing screen.

FIG. 7 A figure showing an example of a reward providing screen.

FIG. 9 A figure showing an example of storing competition data.

FIG. 10 A figure showing an example of storing reward content data.

FIG. 12 A figure showing an example of storing everybody's soccer team data.

FIG. 13 A figure showing an example of storing everybody's soccer team data.

DESCRIPTION OF EMBODIMENTS

[1. Embodiment]

An embodiment of the present invention will be described below in detail with reference to the accompanying drawings.

Figure 1:
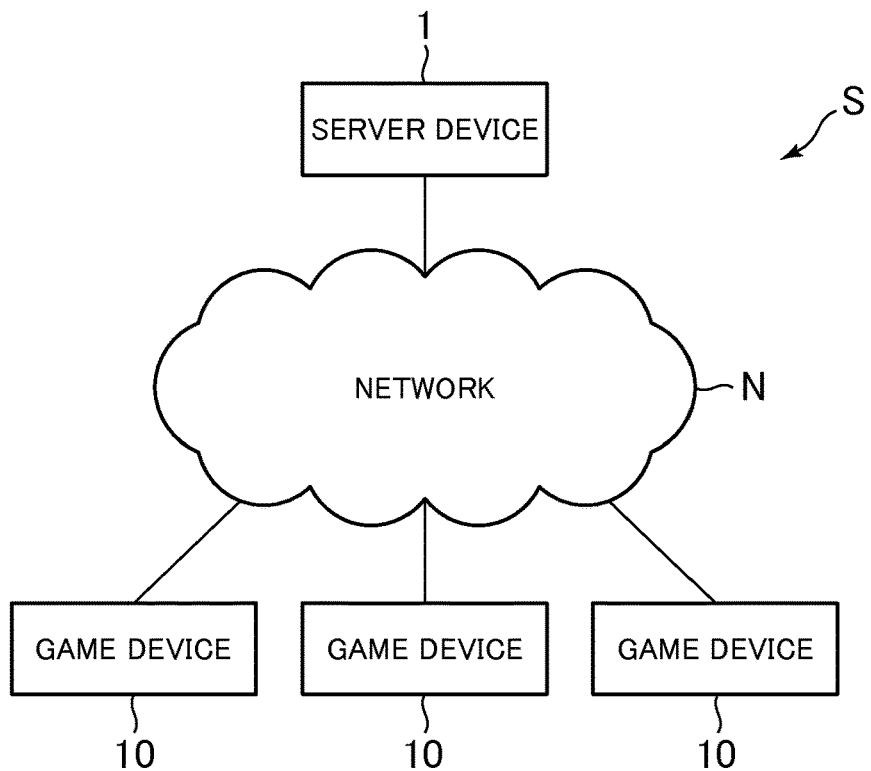
FIG. 1 A figure showing an overall configuration of a game system according to the present invention.

FIG. 1 is a figure showing the overall configuration of a game system according to the present invention. As shown in FIG. 1, the game system S of this embodiment includes a server device 1 that provides overall control of a game and game devices 10 that users operate respectively. The game devices 10 are connected mutually and to the server device 1 through a network N so that data can be transmitted and received between the game devices 10.

Here, a case is discussed in which the game system S includes n number of game devices 10 corresponding to n number of users (n is a natural number, and hereinafter the n number of users are simply referred to as the user). However, devices composing the game system S are not limited thereto.

Figure 2:
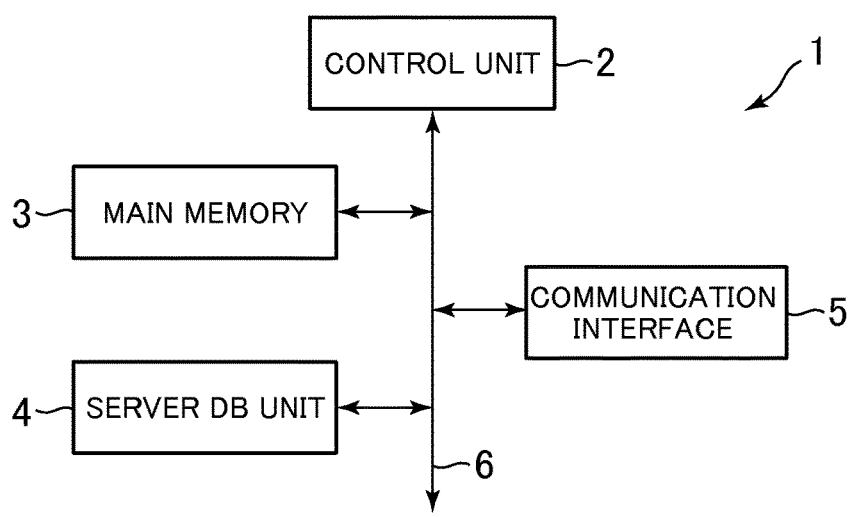
FIG. 2 A figure showing a hardware configuration of a server device.

FIG. 2 is a figure showing a hardware configuration of the server device 1. As shown in FIG. 2, the server device 1 is a server computer including a control unit 2, a main memory 3, a server DB unit 4 (information storage medium), and a communication interface 5, which are connected to one another via a bus 6.

The control unit 2 includes one or more control units (e.g., CPU). The control unit 2 executes an operating system and programs, which are stored in a storage unit (not shown), and provides overall control of respective parts of the server device 1. The main memory 3 includes a RAM, and temporarily stores the operating system, the programs, and various kinds of data.

The server DB unit 4 (information storage medium) includes a large-capacity hard disk, and stores various kinds of data described below. The communication interface 5 is an interface for connecting the server device 1 by wire or wireless to a communication network, such as the Internet.

Figure 3:
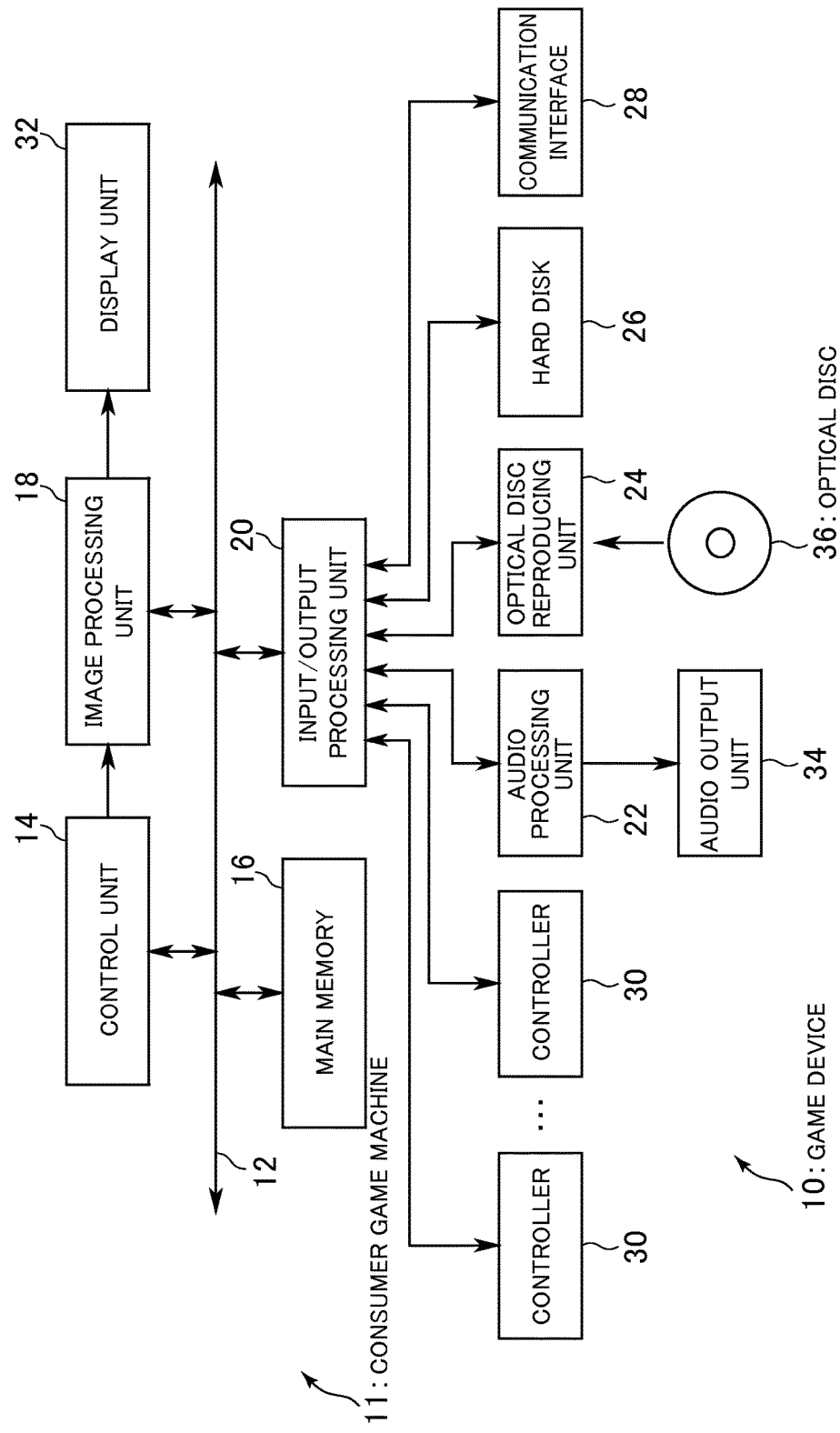
FIG. 3 A figure showing a hardware configuration of a game device.

FIG. 3 is a figure showing a hardware configuration of the game device 10. As shown in FIG. 3, the game device 10 includes a consumer game machine 11, a display unit 32, an audio output unit 34, and an optical disc 36 (information storage medium). Here, a case is discussed in which the game device 10 is implemented by the consumer game machine, although the game device 10 may be implemented by, for example, a portable game machine, a mobile phone (smartphone), and a personal computer.

The display unit 32 and the audio output unit 34 are connected to the consumer game machine 11. The display unit 32 is, for example, a home television receiver or a liquid crystal display. The audio output unit 34 is, for example, speakers or headphones incorporated in the home television receiver.

The consumer game machine 11 is a known computer game system. The consumer game machine 11 includes a bus 12, a control unit 14, a main memory 16, an image processing unit 18, an input/output processing unit 20, an audio processing unit 22, an optical disc reproducing unit 24, a hard disk 26, a communication interface 28, and a controller 30.

The control unit 14 includes one or more control units (e.g., CPU). The control unit 14 controls respective parts of the consumer game machine 11 and executes information processing based on an operating system stored in a ROM (not shown) or a program read from the optical disc 36.

The main memory 16 includes, for example, a RAM. The program and data read from the optical disc 36 are written into the main memory 16. The main memory 16 is also used as a working memory of the control unit 14. The bus 12 is used for sending and receiving addresses and data among respective parts of the consumer game machine 11.

The image processing unit 18 includes a VRAM. The image processing unit 18 draws a game screen on the VRAM based on image data provided from the control unit 14. The game screen drawn on the VRAM is converted into a video signal and output to the display unit 32 at a predetermined timing.

The input/output processing unit 20 is an interface for the control unit 14 to access the audio processing unit 22, the optical disc reproducing unit 24, the hard disk 26, the communication interface 28, and the controller 30.

The audio processing unit 22 includes a sound buffer. The audio processing unit 22 outputs sound data, which is read from the optical disc 36 to the sound buffer, from the audio output unit 34.

The communication interface 28 is an interface for connecting the consumer game machine 11 by wire or wireless to a communication network, such as the Internet.

The optical disc reproducing unit 24 reads a program and data stored in the optical disc 36. In this embodiment, a case is discussed in which the optical disc 36 is used for providing programs and data to the consumer game machine 11. However, other information storage medium, such as a memory card, may be used for providing programs and data to the consumer game machine 11. Alternatively, programs and data may be remotely provided to the consumer game machine 11 via a communication network.

The hard disk 26 is a general hard disk device (auxiliary storage device). In this embodiment, programs and data, which are explained as being stored in the optical disc 36, may be stored in the hard disk 26.

The controller 30 is an operating unit that a user uses to operate a game. The consumer game machine 11 is connected by wire or wireless to one or more controllers 30. The input/output processing unit 20 periodically (e.g., every 1/60 sec.) scans conditions of respective operating members of the controller 30. An operation signal showing a result of the scanning is provided to the control unit 14 via the bus 12. The control unit 14 determines the game operation of the user based on the operation signal.

[2. Game Executed in Game System]

Next, a game executed in the game system S is explained. In this embodiment of the game system S, a case of executing a soccer game, in which two teams play a match, is discussed. Here, two types of soccer games are executed: one is a soccer game representing a real soccer league (hereinafter, "everybody's soccer game") and the other is a soccer game in which users compete with each other (hereinafter, "each one's soccer game").

The everybody's soccer game features soccer teams that belong to the real soccer leagues, and executes a match by the control of a computer. Each user may be able to watch the everybody's soccer game, or be informed of a result of the everybody's soccer game. Here, the everybody's soccer game is executed approximately at the same time when a game of the real soccer league is held between the same paring of the teams as the real game. In the following, each soccer team competing in the everybody's soccer game is referred to as "everybody's soccer team."

On the other hand, in each one's soccer game, soccer teams of respective users play against each other. When registering in the game system S, each user selects his/her favorite soccer team from the soccer teams that belong to the real soccer leagues. Subsequently, each user creates a soccer team for a use in a game, and places characters representing real soccer players or virtual characters under the team. In this regard, the players belonging to the soccer team may be set based on the real soccer players belonging to the user's favorite soccer team, or selected by the user regardless of the user's favorite soccer team.

In the following, soccer teams that play against each other in an each one's soccer game (i.e., soccer team used by each user) are referred to as "each one's soccer teams." When the user plays his/her each one's soccer game, a user who is an opponent of the user is selected on an opponent selecting screen.

Figure 4:
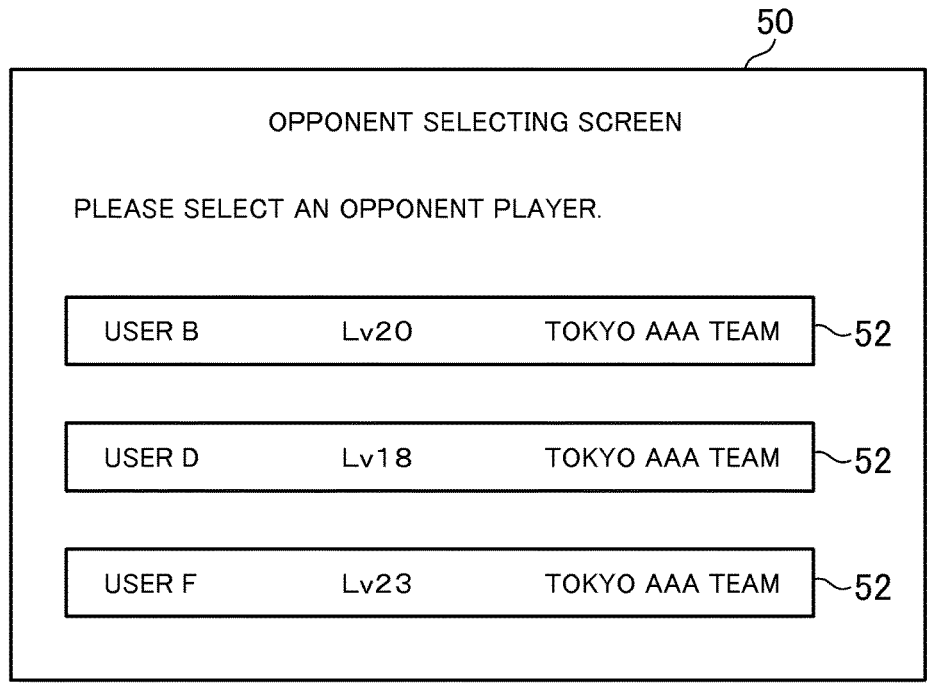
FIG. 4 A figure showing an example of an opponent selecting screen.

FIG. 4 is a figure showing an example of the opponent selecting screen. As shown in FIG. 4, on the opponent selecting screen 50 displayed on the game device 10 that a user operates, opponent candidate information 52 relating to a user to be an opponent candidate of the user is displayed. The opponent candidate information 52 includes information for identifying other users and information relating to the other users' soccer teams.

In this embodiment, other users indicated by the opponent candidate information 52 are selected such that a paring of the user's favorite team and the other user's favorite team is the same as the paring of the match of the real soccer league, a detail of which will be described later. The user selects an opponent in the each one's soccer game based on information shown in the opponent candidate information 52.

The each one's soccer game starts when the opponent is selected on the opponent selecting screen 50. Here, soccer players belonging to the each user's soccer team basically operate autonomously by operation of the computer.

When starting the each one's soccer game, the user specifies his/her own team's formation, starters, substitutes, and strategy. The characters act as specified by the user and based on the behavioral algorithm as defined by the game program. In this regard, the user may appropriately input some of the operations, such as an instruction to the character to shoot. When the each one's soccer game is finished, a match result screen indicating a result of the match is displayed on the user's game device 10.

Figure 5:
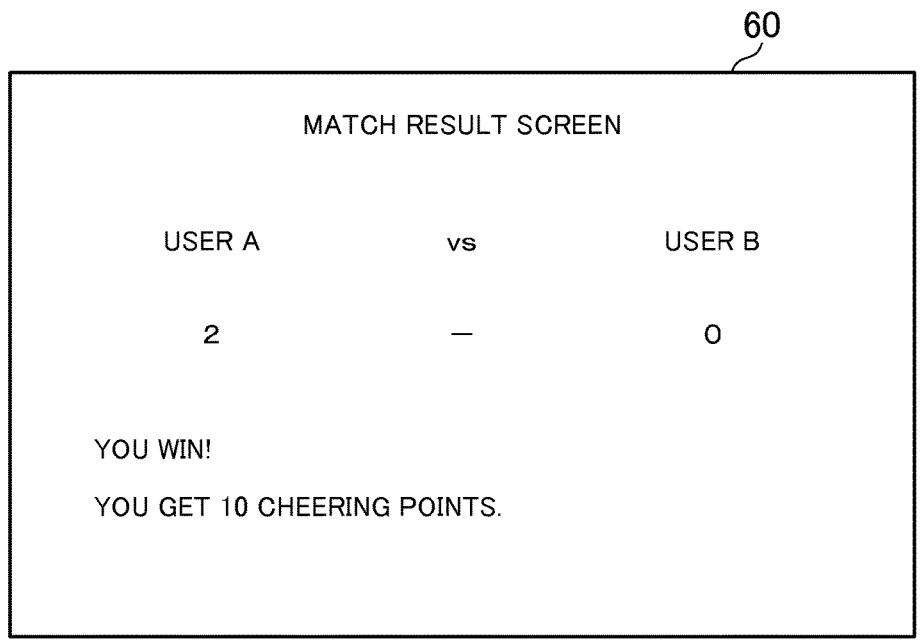
FIG. 5 A figure showing an example of a match result screen.

FIG. 5 is a figure showing an example of the match result screen. As shown in FIG. 5, the match result screen 60 displays a result of a match of an each one's soccer game. The result of the match includes information on wins and losses, scores of the each one's soccer team, and cheering points given to the user.

The cheering point is in-game currency that is given to a user when an each one's soccer game is executed. The user can give the obtained cheering point to the everybody's soccer team. The everybody's soccer team that has obtained the cheering point from the user can take advantage of the everybody's soccer game under the predetermined conditions.

Here, each user may give his/her cheering point to the everybody's soccer team corresponding to his/her favorite team, or give the cheering points to the other soccer team. The user selects an everybody's soccer team, to which the user gives the cheering points, on the cheering point providing screen, and enters the number of the cheering points to give.

FIG. 6 is a figure showing an example of the cheering point providing screen. As shown in FIG. 6, the cheering point providing screen 70 displays match information 72 indicating a match and a game schedule of the upcoming everybody's soccer game, cheering point entering images 74 of the everybody's soccer teams to which a user gives cheering points and enters the number of the cheering points, and an enter button 76 for proceeding the process to give the cheering points.

Each user gives his/her cheering points to the everybody's soccer team. When a match date (i.e., match date of real soccer league) of the everybody's soccer team is approaching, giving the cheering point is closed. Then, when the match date and time comes, the everybody's soccer game is executed. In the everybody's soccer game, when a team receives more cheering points from each of the users, the team can have more advantages in the game, which will be described later in detail.

When the everybody's soccer game is finished, the reward providing screens are displayed on the game devices 10, which are operated by the users who have provided the cheering points, and each of the users receives the points respectively.

FIG. 7 is a figure showing an example of the reward providing screen. Here, as a reward, the user receives points (hereinafter referred to as event generating point) for generating a game event in which the user obtains the soccer players to belong to the each one's soccer team. As shown in FIG. 7, the reward providing screen 80 displays a point image 82 indicating the event generating points given to the user. The user generates the given game event with use of the event generating points, and then can obtain the soccer players to belong to the user's soccer team.

As described above, in the game system S of this embodiment, the everybody's soccer team that has received the cheering points from the users has advantages in the game. When the everybody's soccer game is finished, the users who have given the cheering points are to receive the reward. This technology will be described in detail below.

[3. Functions Implemented in Game System]

Figure 8:
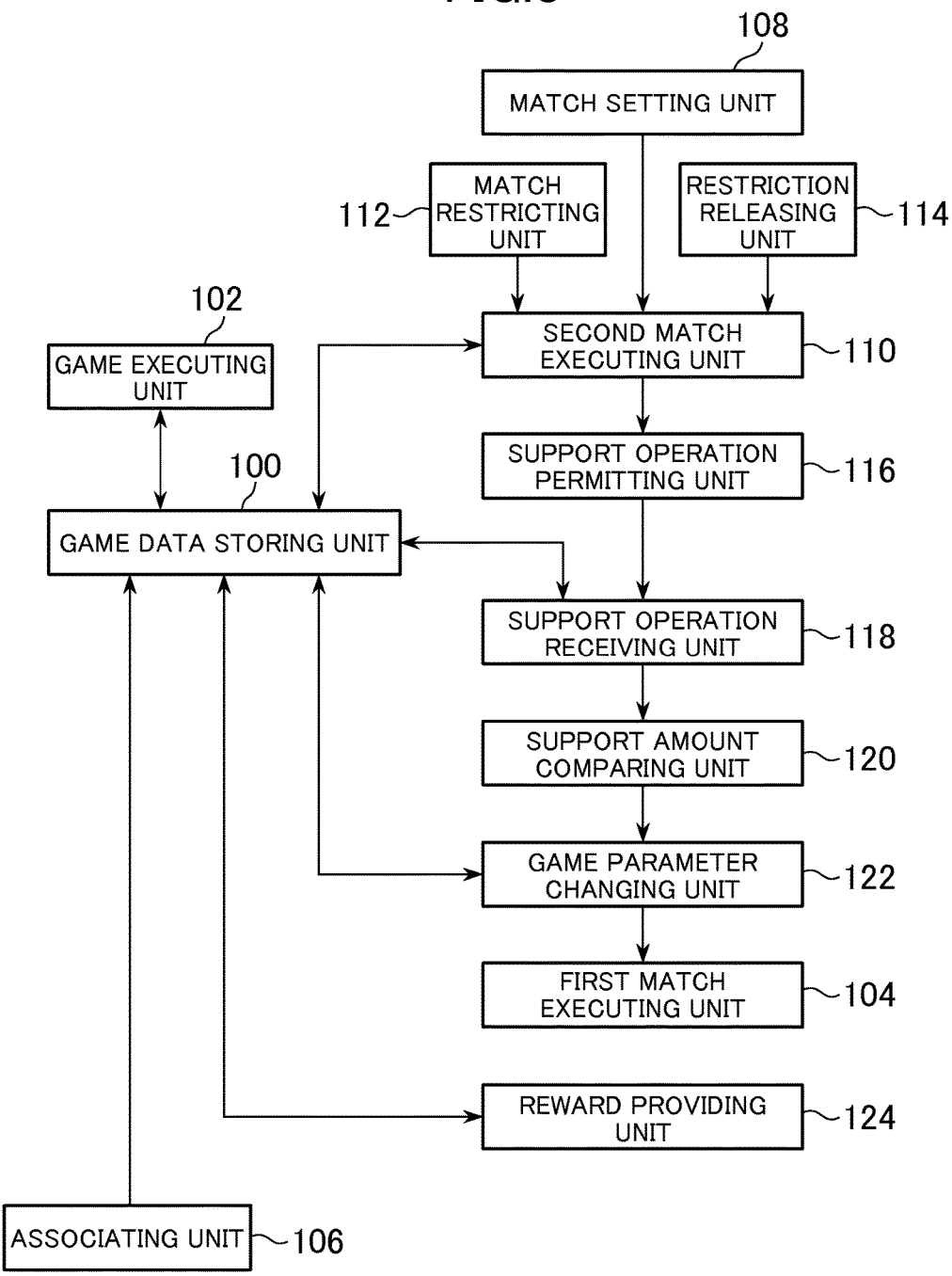
FIG. 8 A functional block diagram showing functions that are implemented in the game system and related to the present invention.

FIG. 8 is a functional block diagram showing functions implemented in the game system S and relating to the present invention. The game system S executes a game program to implement a game data storing unit 100, a game executing unit 102, a first match executing unit 104, an associating unit 106, a match setting unit 108, a second match executing unit 110, a match restricting unit 112, a restriction releasing unit 114, a support operation permitting unit 116, a support operation receiving unit 118, a support amount comparing unit 120, a game parameter changing unit 122, and a reward providing unit 124. The following explains a case where the above functions are implemented by the server device 1.

[3-1. Game Data Storing Unit]

The game data storing unit 100 is implemented by, for example, a server DB unit 4. The game data storing unit 100 stores various data necessary for executing a game. Here, the game data storing unit 100 stores (1) master data, (2) user data indicating various information on each user, (3) everybody's soccer team data relating to everybody's soccer teams, and (4) everybody's soccer game data relating to everybody's soccer games.

[Master Data]

The master data stores various basic information on games executed in the game system S. Here, competition data of a plurality of competition teams or competition players in either the real or virtual world is stored in the master data. In this embodiment, a case is discussed in which a game is executed regarding a real soccer team, although "real soccer team" may be replaced with "a plurality of competition teams or competition players in either the real or virtual world."

FIG. 9 is a figure showing an example of storing competition data. As shown in FIG. 9, the competition data stores information on kinds of real-world soccer teams. One of the soccer teams stored in the competition data is set as the user's favorite team.

The master data also stores reward content data in which support amount and rewards given to the user are associated with each other. The support amount is support operation amount and, in this embodiment, cheering point amount (amount of votes for the soccer team) that each user gives to the everybody's soccer team.

FIG. 10 is a figure showing an example of storing reward content data. As shown in FIG. 10, the reward content data stores a support amount condition and reward content information, which indicates details of rewards, in association with each other. The support amount condition is a condition indicating whether or not the support amount is within a predetermined range, and, in this embodiment, a condition indicating whether or not a cheering point amount that each user gives to the everybody's soccer team is within a predetermined range. As shown in FIG. 10, when a user gives more cheering points to the everybody's soccer team, the reward to the user is increased (the event generating points are increased).

Here, a case is discussed in which the reward content data is explained as tabular data, although the reward content data may be data in the form of numerical expressions described in a game program. That is, the reward content data may be data in the form of numerical expressions by which the event generating point to be given to a user is calculated when the number of the cheering points given by the user is substituted.

[User Data]

Figure 11:
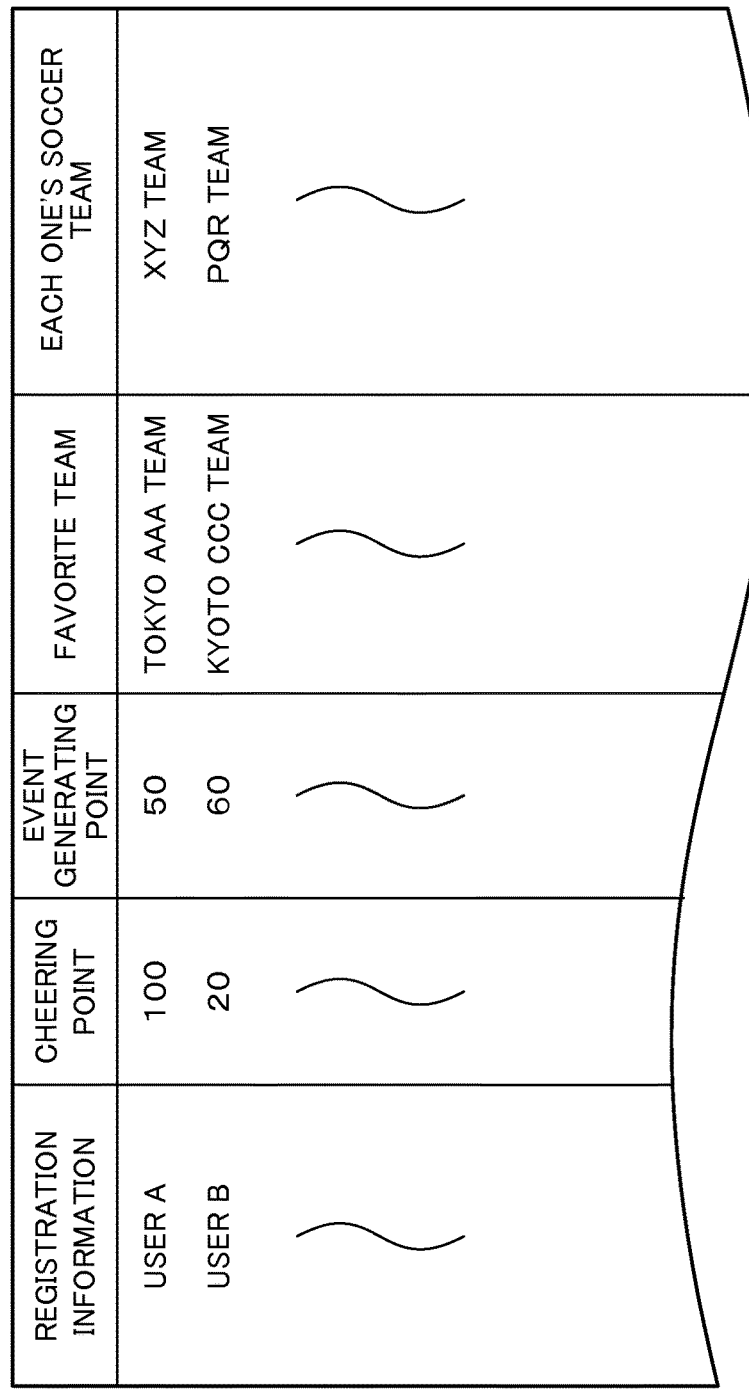
FIG. 11 A figure showing an example of storing user data.

FIG. 11 is a figure showing an example of storing user data. As shown in FIG. 11, the user data stores, for example, registration information of users, cheering points that the users have, event generating points that the users obtain, favorite team information indicating soccer teams associated with respective users, and information on each one's soccer teams the users use in the matches respectively. When a user registers to use the game system S, new record is generated in the user data. The record is updated according to the game play of the user or a given operation to change the record.

The user's registration information includes, for example, user's name for uniquely identifying the users, information on the strength of the users (e.g., numerical values or symbols indicating a level or an experience point) and attribute information indicating the user's attribute. The information on the user's strength is updated according to the user's game play (e.g., a result of a match). The attribute information is the user's personal information (registration information), and stores, for example, information on the user himself/herself (e.g., place of residence, age, gender, family relationship, occupation), or information on the user's taste.

The information on the each one's soccer team includes information on names of the soccer teams that the users use, information on soccer players that belong to the soccer teams, and information on record of match results (results of games) of the soccer teams.

The information on the soccer players includes names of soccer players who belong to the each one's soccer teams, roles (e.g., positions) of the soccer players, and conditions (e.g., ability values or shape) of the soccer players. The information indicating the conditions of the soccer players is a game parameter on the soccer players, and is updated according to progress of the game. The information on the record of match results of the soccer teams includes rankings, numbers of wins and losses, and goal differences of the each one's soccer teams.

[Everybody's Soccer Team Data]

FIG. 12 is a figure showing an example of storing data of the everybody's soccer teams. As shown in FIG. 12, the data of the everybody's soccer teams stores names of the everybody's soccer teams, information on the players who belong to the everybody's soccer teams, and information on the record of match results of the everybody's soccer teams, in association with one another.

Here, the names of the everybody's soccer teams are determined based on the real soccer teams, and, for example, the names determined by the competition data are stored. The information on the soccer players who belong to the everybody's soccer teams includes names of the soccer teams that the users use, the soccer players who belong to the soccer teams, and the record of match results (results of games) of the soccer teams.

The information on the soccer players includes names of soccer players who belong to the everybody's soccer teams (names are determined based on soccer players who belong to the real soccer teams), roles (e.g., positions) of the soccer players, and conditions (e.g., ability values or shape) of the soccer players. The information indicating the condition of the soccer players is a game parameter on the soccer players, and is updated according to progress of the game. The information on the record of match results of the soccer teams includes rankings, numbers of wins and losses, and goal differences of the each one's soccer teams.

[Everybody's Soccer Game Data]

FIG. 13 is a figure showing an example of storing data of the everybody's soccer games. As shown in FIG. 13, the everybody's soccer game data includes match pairing data, date and time data, and support status data. The match pairing data is data regarding the match pairing (match) of teams in the real or virtual world. Here, the match pairing of the everybody's soccer games is determined based on the match pairing of the real soccer league, and thus the match pairing data is data indicating the match pairing of the everybody's soccer games.

The date and time data is data regarding dates and times of real or virtual sport matches. Here, a date and time when an everybody's soccer game is executed is determined based on a date and time of a match of the real soccer league, and thus the date and time data is data indicating the date and time of the everybody's soccer game.

The support status data is data of support amounts regarding a plurality of items of game data, and, in this embodiment, stores the cheering point amounts provided by the users to the everybody's soccer teams. When the support operation receiving unit 118, which is described later, receives a support operation (operation to give cheering point) from each user, the support status data is updated. For example, when a user gives a cheering point to the everybody's soccer team, the cheering point stored in the support status data is incremented by the value specified by the user. Here, the support status data stores information for identifying a user who has given a cheering point and information indicating the cheering point amount given by the user, in association with each other.

The control unit 2 and the control unit 14 function as means for obtaining content stored in the game data storing unit 100. Data structure of each data is not limited to the example described above. Further, data stored in the game data storing unit 100 is not limited to the example described above. For example, the game data storing unit 100 may store data indicating current status of the everybody's soccer game being executed, and data indicating current status of the each one's soccer game being executed.

[3-2. Game Executing Unit]

The game executing unit 102 is mainly implemented by the control unit 2. The game executing unit 102 executes various kinds of processing relating to a game. For example, the game executing unit 102 updates content stored in the game data storing unit 100 according to the user's operation or progress of the game.

[3-3. First Match Executing Unit]

The first match executing unit 104 is mainly implemented by the control unit 2. The first match executing unit 104 executes a match (first match) based on a plurality items of game data. The first match is a match relating to a sport in a real or virtual world, and is an everybody's soccer game in this embodiment.

The "game data" mentioned above is data indicating characters, machines, and cards, each of which competes against an opponent in match games (opponent target, single body or group), and data indicating teams or armies to which the opponent target belong, and card decks. A game is executed in which the targets of the support operation by the users compete. As such, it can be said that a target of each user to support corresponds to "game data." Here, each item of data, which is stored in the everybody's soccer team data and indicative of the everybody's soccer team, corresponds to "game data."

The first match executing unit 104 operates to move the soccer players, who belong to the soccer teams, in response to an operation of a player or a computer, and updates data indicating the current status of the everybody's soccer game, thereby executing the everybody's soccer game. When the first match executing unit 104 executes the everybody's soccer game, information on the match result of the everybody's soccer game is generated based on the execution result. The record of match results of the everybody's soccer game data is updated based on the generated information.

[3-4. Associating Unit]

The associating unit 106 is implemented mainly by the control unit 2. The associating unit 106 associates each of users with at least one of competition teams or competition players. That is, the associating unit 106 associates users with soccer teams selected by the respective users or computers, and stores the users and soccer teams in the game data storing unit 100.

Each user is shown the soccer teams stored in the competition data. For example, a list of the soccer teams is displayed on a user's game device 10, and the soccer team selected by the user is associated with the user. The soccer team associated with the user is registered in the user data as the favorite team of the user.

[3-5. Match Setting Unit]

The match setting unit 108 is implemented mainly by the control unit 2. The match setting unit 108 determines a match pairing of a second match or candidates of the match pairing of the second match, so that the paring of the competition teams (e.g., each one's soccer team) or the competition players associated with the users who play against each other in the second match (e.g., each one's soccer team) corresponds to the match pairing of the real or virtual competition (e.g., real soccer game).

"Corresponds to the match pairing" means that a pairing of the users' favorite teams competing in the each one's soccer game and a match pairing of real soccer games have a predetermined relationship. For example, the combination of the user's favorite teams competing in the each one's soccer game and the match pairing of the real soccer league (i.e., the match pairing of the everybody's soccer game) are the same match pairing.

Here, the each one's soccer game is executed based on the match pairing of the each one's soccer game determined by the match setting unit 108. For example, the match may be executed by the match pairing of the each one's soccer game determined by the match setting unit 108, or by the match pairing selected by the user or the computer, among from the candidates of the match pairings of the each one's soccer games determined by the match setting unit 108.

It can be said that the match pairing of the each one's soccer game is a match pairing of users. That is, it can be said that the match setting unit 108 determines a match pairing of a user and the other user.

[3-6. Second Match Executing Unit]

The second match executing unit 110 is implemented mainly by the control unit 2. The second match executing unit 110 executes the second match (e.g., each one's soccer game) based on game data of at least two of the plurality of users. Here, the second match executing unit 110 executes the each one's soccer game based on the match pairing of the each one's soccer game determined by the match setting unit 108, or the match pairing selected from the candidates of the match pairings of the each one's soccer game.

The second match executing unit 110 operates to move the soccer players, who belong to the soccer teams, in response to an operation of a user or a computer, and updates data indicating the current status of the each one's soccer game, thereby executing the everybody's soccer game. Based on the execution result of the match, a match result is obtained. The information of user data indicating the results of games is updated based on the obtained match result.

[3-7. Match Restricting Unit]

The match restricting unit 112 is implemented mainly by the control unit 2. The match restricting unit 112 restricts an execution of a second match (here, each one's soccer game) by the second match executing unit 110. "Restricts execution of a second match" means prohibiting the each one's soccer game from being executed, and preventing a user from playing the each one's soccer game. Here, a case is discussed in which an each one's soccer game can be played only during the term corresponding to a date and time at which a real soccer is executed.

[3-8. Restriction Releasing Unit]

The restriction releasing unit 114 is implemented mainly by the control unit 2. The restriction releasing unit 114 releases restriction of executing the second match (here, each one's soccer game) during the term corresponding to a date and time indicated by the date and time data. "Release restriction of executing the each one's soccer game" means enabling the execution of the each one's soccer game, and allowing the user to play the each one's soccer game.

"The term corresponding to a date and time indicated by the date and time data" is a predetermined term including a date and time indicated by the date and time data, or a predetermined term prior to the date and time. In this embodiment, the restriction is released so that the each one's soccer game is executed during the term corresponding to the date and time at which the real soccer league is executed.

[3-9. Support Operation Permitting Unit]

The support operation permitting unit 116 is implemented mainly by the control unit 2. The support operation permitting unit 116 permits the user, who has played in the second match, to perform a support operation based on a match result of the second match (here, each one's soccer game). The support operation is a predetermined operation performed by a user, and is an operation performed by the user to give a cheering point (operation to give a cheering point from the cheering point providing screen 70). In other words, the support operation is a predetermined operation for giving an advantage or a disadvantage to each team playing in the everybody's soccer game, and can be said to be an operation to vote for the everybody's soccer team.

The support operation permitting unit 116 permits at least one user who has played in the each one's soccer game to perform an operation to support the everybody's soccer team. Here, a case is discussed in which the user is allowed to perform a support operation when the user plays in the each one's soccer game, although the support operation may be permitted only when the user has won the game.

"Permit support operation" means allowing a user to perform a support operation, and giving a cheering point in this embodiment. If the cheering point is 0, it is not possible to give a cheering point to the everybody's soccer team, and thus the support operation is restricted. That is, if a user has played in the each one's soccer game, a state in which the user is prevented from performing a support operation is changed to a state in which the restriction is released and the user can perform the support operation.

[3-10. Support Operation Receiving Unit]

The support operation receiving unit 118 is implemented mainly by the control unit 2. The support operation receiving unit 118 receives support operations for a plurality of items of game data (e.g., everybody's soccer team) from a plurality of users at least one of either prior to and during the first match (e.g., before or during the execution of the everybody's soccer game). The support operation receiving unit 118 receives support operations from users at any point until the everybody's soccer game is finished.

In this embodiment, the support operation receiving unit 118 receives support operations for a plurality of items of game data (here, everybody's soccer team) from the users who are allowed to perform a support operation. That is, the support operation receiving unit 118 receives votes for the cheering point to the everybody's soccer team from the user who is given the cheering point.

[3-11. Support Amount Comparing Unit]

The support amount comparing unit 120 is implemented mainly by the control unit 2. The support amount comparing unit 120 compares support amounts of respective items of game data (here, everybody's soccer team). The support amount comparing unit 120 obtains and compares support amounts for respective everybody's soccer teams based on the result of support operations received at the support operation receiving unit 118 from the respective users. Here, the support amount comparing unit 120 refers to the support status data stored in the everybody's soccer game data, and compare the total number of the cheering points given to the respective everybody's soccer teams.

[3-12. Game Parameter Changing Unit]

The game parameter changing unit 122 is implemented mainly by the control unit 2. The game parameter changing unit 122 changes a game parameter relating to the match result based on the support operation for the plurality of items of game data so as to give a more advantage or disadvantage to at least one of the items of game data than prior to receiving the support operation.

"Game parameter relating to the match result" is a game parameter that makes a match advantageous or disadvantageous as its value changes, and is a game parameter indicating a condition of the everybody's soccer team in this embodiment. When the game parameter indicating the condition of the everybody's soccer team changes, an ability value of a soccer player who belongs to the everybody's soccer team changes, which gives an advantage or disadvantage to the team. When the everybody's soccer team gets an advantage, the team is more likely to win a match, and when the everybody's soccer team gets a disadvantage, the team is likely to lose a match.

Here, the game parameter changing unit 122 changes the game parameter based on a result of the comparison of the support amount comparing unit 120. The game parameter changing unit 122 changes the game parameter so as to give an advantage to the everybody's soccer team, which has more support amounts (total number of cheering points) of the two everybody's soccer teams playing against each other.

[3-13. Reward Providing Unit]

The reward providing unit 124 is implemented mainly by the control unit 2. The reward providing unit 124 provides a reward (e.g., event generating point) to a user who has performed a support operation based on the result of the match (first match). A reward is data (data for obtaining merit in a game) given to users, for example, in-game currency or an item usable in a game.

In this embodiment, the reward providing unit 124 has means for obtaining content of the reward associated with the support amounts for a plurality of items of game data (e.g., everybody's soccer team), and provides the reward having the obtained content to the users who have performed a support operation for the plurality of items of game data. The reward providing unit 124 refers to the reward content data, and specifies a support amount condition that is satisfied by the cheering point given by the user. The reward is provided to the user who has performed the support operation based on the content of the reward associated with the support amount condition. The information indicating the user who has performed the support operation and the support amount of the user is stored, for example, in the support status data.

[4. Processing Executed in Game System]

Next, the processing executed in the game system S will be discussed. Here, the following explains everybody's soccer game executing processing for executing an everybody's soccer game, and each one's soccer game executing processing for executing an each one's soccer game. The processing described below is performed when the control unit 2 executes a program stored in a storing unit of the server device 1, and the control unit 14 executes a program stored in the optical disc 36.

[4-1. Everybody's Soccer Game Executing Processing]

Figure 14:
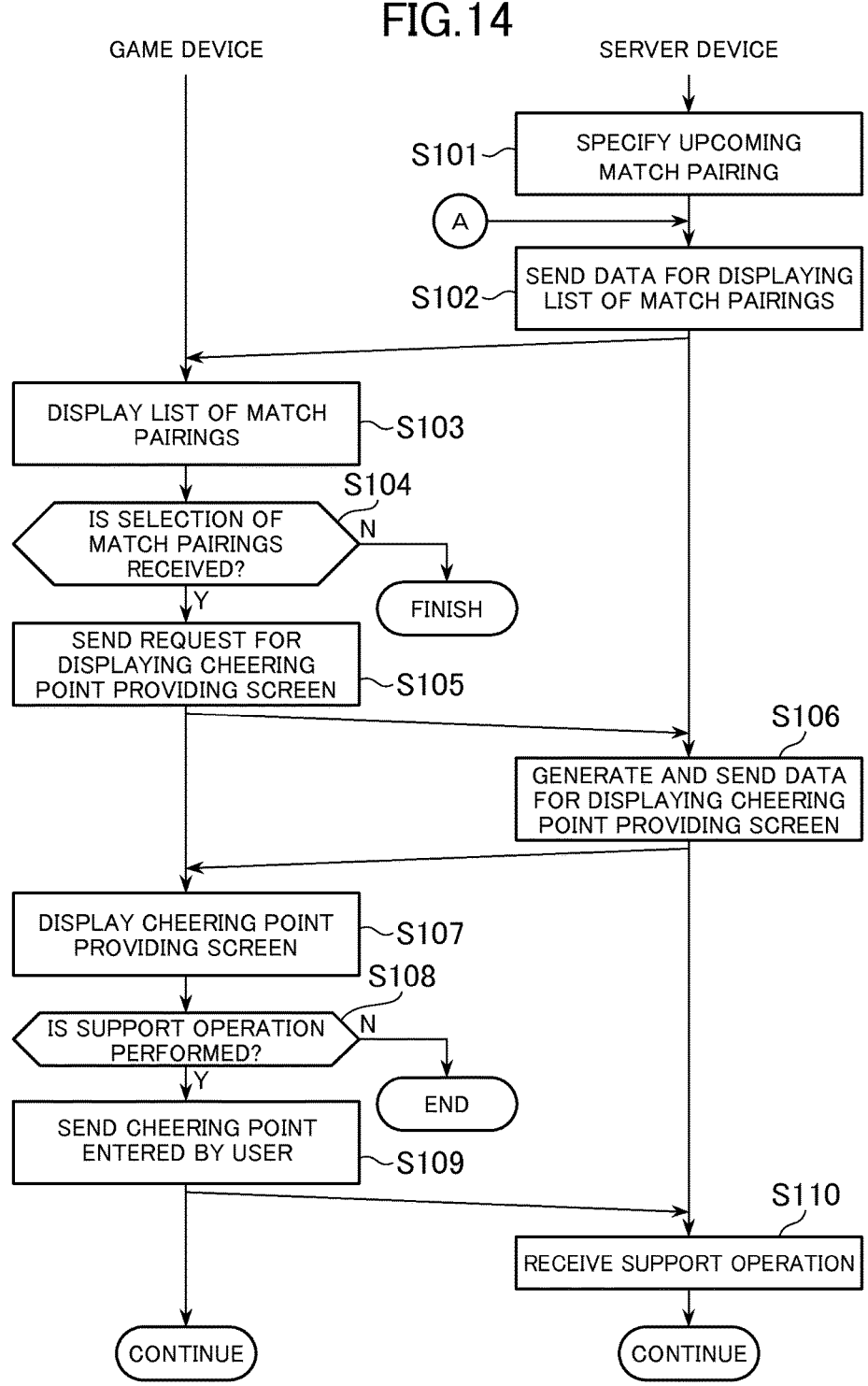
FIG. 14 A figure showing an example of everybody's soccer game executing processing.
Figure 15:
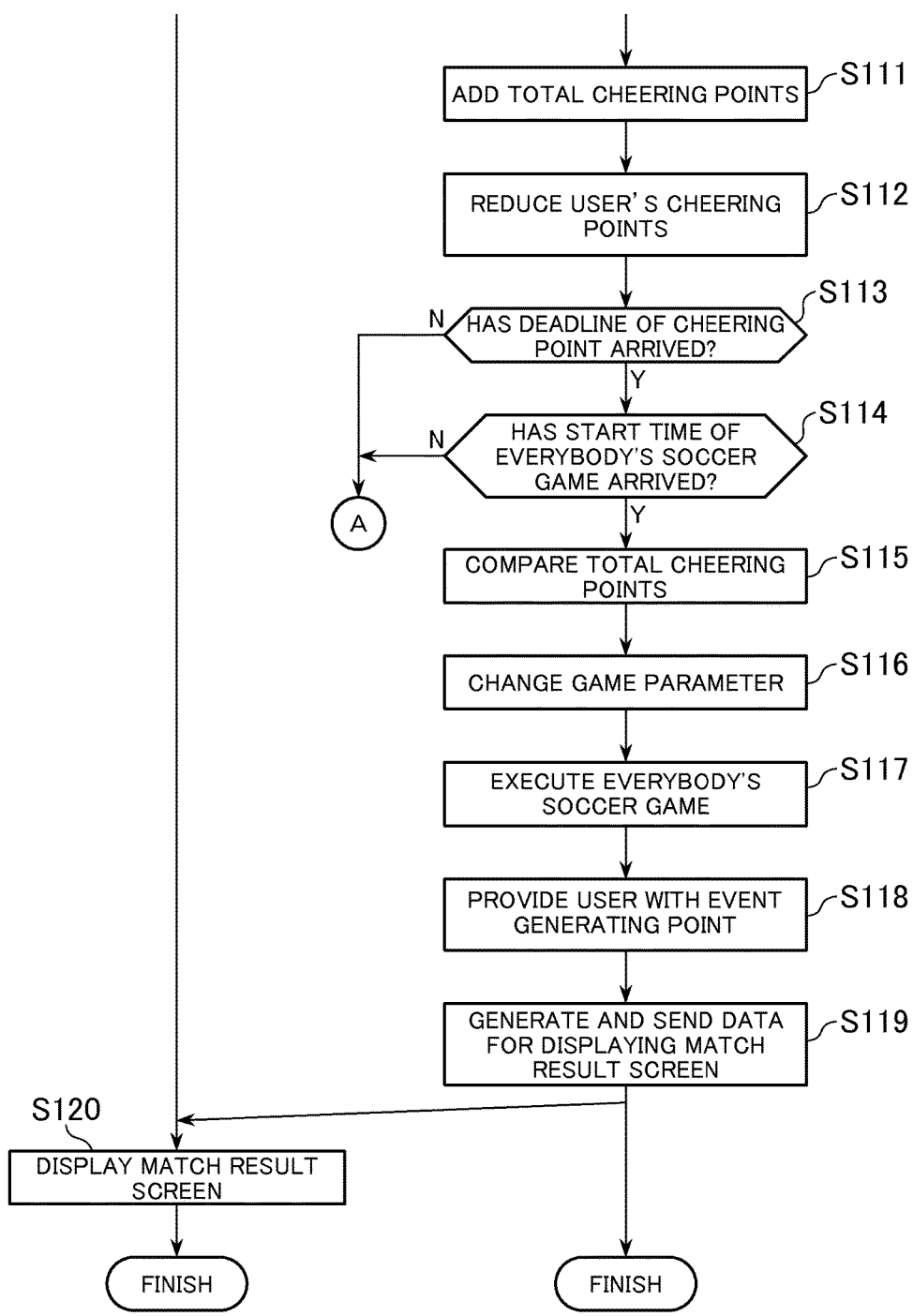
FIG. 15 A figure showing an example of everybody's soccer game executing processing.

FIGS. 14 and 15 show examples of the everybody's soccer game executing processing. As shown in FIG. 14, in the server device 1, the control unit 2 refers to the everybody's soccer game data, and specifies the upcoming match pairing among the everybody's soccer games that will be held (S101). The control unit 2 generates data for displaying a screen (not shown) indicating a list of upcoming match pairings, and sends the generated data to the game device 10 (S102).

The control unit 14 of the game device 10 displays the screen indicating the list of the upcoming match pairings on the display unit 32 (S103). Each of the users selects a match pairing to which he/she gives his/her cheering points.

The control unit 14 determines whether or not it has received the selection of match pairing from the user (S104). If it is determined that the selection of match pairing is received (S104; Y), the control unit 14 sends to the server device 1 a request for displaying the cheering point providing screen 70 relating to the match pairing, together with information for identifying the user and information for identifying the match pairing selected by the user (S105).

When the server device 1 receives the request for displaying the cheering point providing screen 70, the control unit 2 refers to the user data to specify the cheering point owned by the user, generates data for displaying the cheering point providing screen 70 indicating the match pairing selected by the user, and sends the generated data to the game device 10 (S106).

When the game device 10 receives the data for displaying the cheering point providing screen 70, the control unit 14 displays the cheering point providing screen 70 on the display unit 32 (S107). In S107, the point owned by the user or the match pairing specified by the user is displayed on the cheering point providing screen 70.

The control unit 14 determines whether or not the support operation is performed (S108). In S108, it is determined whether or not the user inputs the cheering point and selects the enter button 76 in order to determine whether or not the support operation for the everybody's soccer team is performed. If it is determined that the support operation is performed (S108; Y), the control unit 14 sends information indicating the cheering point entered by the user to the server device 1 (S109).

The control unit 2 of the server device 1 receives the cheering point entered by the user and the support operation of the user (S110). Referring to FIG. 15, the control unit 2 associates the user with the number of cheering points to store them in the support status data, and adds the total cheering points of the everybody's soccer team specified by the user to them (S111). The control unit 2 reduces the cheering points of the user by the number of the cheering points provided by the user (S112).

The control unit 2 refers to the date and time data, and determines whether or not the deadline of the cheering point has arrived (S113). The deadline of the cheering point is a point of time corresponding to the date and time of the match indicated by the date and time data, for example, a point of time before a predetermined period of time from the match.

If it is determined that the deadline of the cheering point has not arrived (S113; N), the processing returns to S102 and accepts an operation for providing a cheering point from each user.

If it is determined that the deadline of the cheering point has arrived (S113; Y), the control unit 2 refers to the match date and time data to determine whether or not the start time of the everybody's soccer game has arrived (S114). If it is determined that the start time of the everybody's soccer game has arrived (S114; Y), the control unit 2 refers to the support status data to compare the total cheering points provided to the respective everybody's soccer teams (S115).

The control unit 2 changes the game parameter, which indicates the condition of the everybody's soccer team, based on a comparison result in S115 (S116). For example, the control unit 2 increases the game parameter indicating the condition of the everybody's soccer team having the larger number of total cheering points in order to give the team an advantage, and reduces the game parameter indicating the condition of the everybody's soccer team with the smaller number of total cheering points in order to give the team a disadvantage.

The control unit 2 executes the everybody's soccer game based on the game parameter change in S116 (S117). The screen showing the everybody's soccer game executed in S117 may be distributed to each game device 10 in real time.

The control unit 2 provides each user who gives a cheering point with an event generating point based on the match result of the everybody's soccer game (S118). In S118, the support status data is referred to so that the users who have provided the cheering points and the number of the cheering points provided by the users are specified. Subsequently, the reward content data is referred to, and the event generating points in the amount associated with the condition, which is satisfied with the number of the cheering points (support amount), is determined as a reward to be provided to the user. The number of the obtained points stored in the user data is increased by the number of the determined event generating points, and thereby the reward is provided to the user.

The control unit 2 generates data for displaying the match result screen 60 indicating the number of the cheering points determined in S118 and the match result of the everybody's soccer game, and sends the generated data to the game device 10 (S119).

On the other hand, when the game device 10 receives the data for displaying the match result screen 60, the control unit 14 displays the match result screen 60 on the display unit 32 (S120). The user views the number of the event generating points displayed on the match result screen 60, thereby grasping the reward given to the user.

[Each One's Soccer Game Executing Processing]

Figure 16:
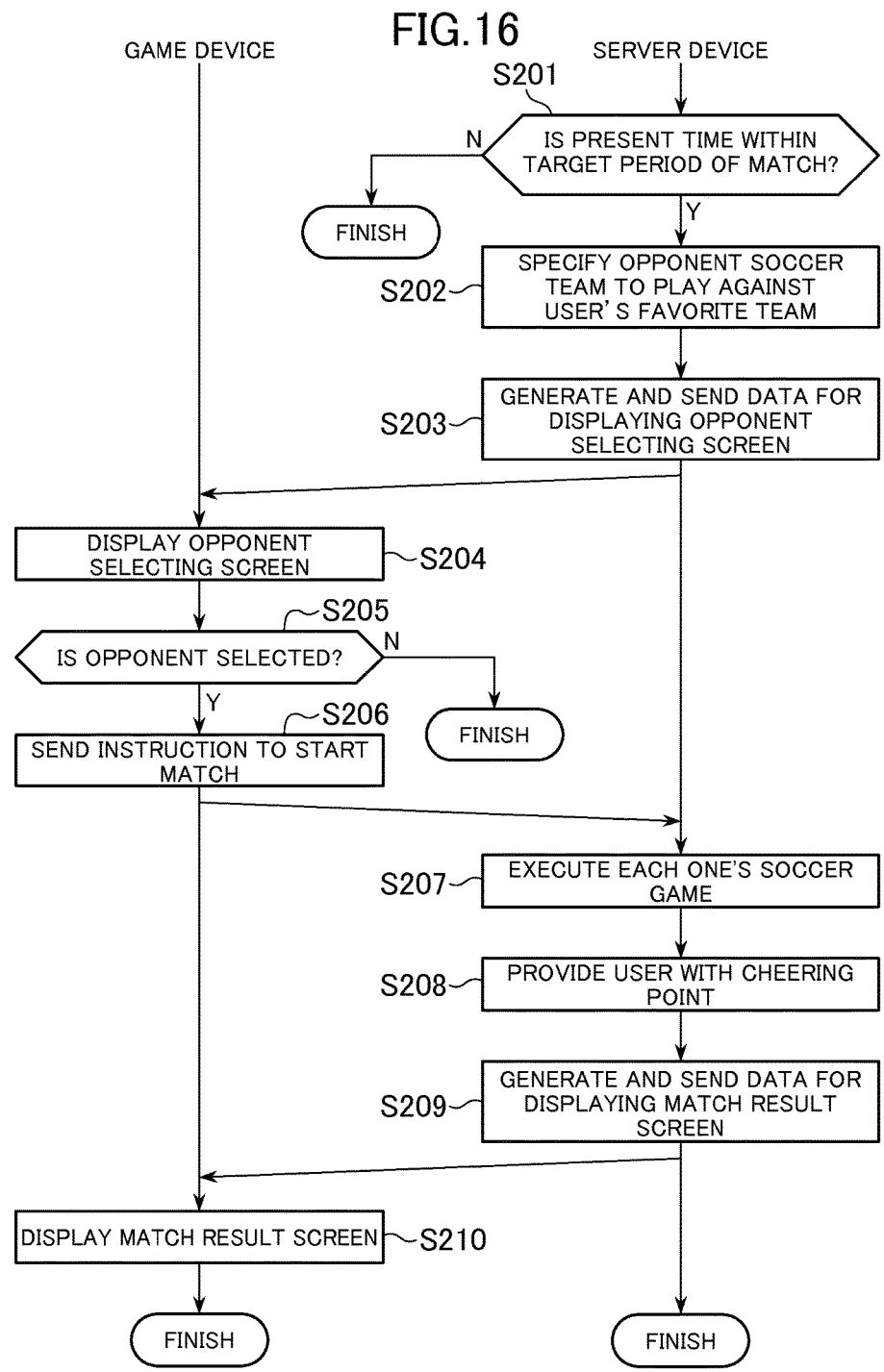
FIG. 16 A figure showing an example of each one's soccer game executing processing.

FIG. 16 shows an example of the each one's soccer game executing processing. As shown in FIG. 16, the control unit 2 of the server device 1 refers to the date and time data stored in the everybody's soccer game data to determine whether or not the present time is within a target period of the match (S201). The target period of the match is a period in which an everybody's soccer game is permitted to be executed and which corresponds to the date and time indicated by the date and time data. For example, it is a period from a time point, which is predetermined period of time before a real soccer game, to the time point the real soccer game is executed.

If it is determined that it is within the target period of the match (S201; Y), the control unit 2 refers to the user data and the match pairing data to specify a favorite team of a user and a match pairing, and also specifies the opponent soccer team that plays against the favorite team in the upcoming match (S202).

The control unit 2 refers to the user data to specify the users who have registered the opponent team as the favorite team. The control unit 2 then generates data for displaying the opponent selecting screen 50 indicating the users of the specified opponent candidates, and sends the generated data to the game device 10 (S203).

On the other hand, when the game device 10 receives the data for displaying the opponent selecting screen 50, the control unit 14 displays the opponent selecting screen 50 on the display unit (S204). The control unit 14 determines whether or not the opponent candidate information 52 is selected by the user (S205).

If it is determined that the opponent candidate information 52 is selected by the user (S205; Y), the control unit 14 sends an instruction to start the match to the server device 1 (S206).

When the server device 1 receives the instruction to start the match, the control unit 2 executes the each one's soccer game against the opponent user selected by the user (S207). In S207, the each one's soccer game is executed by referring to the user data and based on information on the each one's soccer teams of the user and the opponent user.

When the each one's soccer game finishes, the control unit 2 provides the user with the cheering point by increasing the number of the cheering points stored in the user data (S208). The control unit 2 generates data for displaying the match result screen 60 indicating the match result of the each one's soccer game and the cheering point provided to the user, and send the generated data to the game device 10 (S209).

On the other hand, the control unit 14 of the game device 10 receives the data for displaying the match result screen 60, and displays the data on the display unit 32 (S210). The user views the match result screen 60, thereby grasping the cheering point that the user has obtained. Further, the user can understand that it is possible to provide the everybody's soccer team with a cheering point.

According to the game system S as described above, the user provides the everybody's soccer team with a cheering point, thereby giving the team an advantage in the match. Further, it is possible to give a reward to the user who has provided the cheering point. In this way, the user can enjoy a feeling as if the user supports the match.

A cheering point is given when the users play against each other, and thus it is possible to expedite matches among the users. Further, the match pairings of the each one's soccer games are set based on the match pairing of real soccer teams, and thus the user can feel as if he/she cooperates with his/her favorite teams. The user can also feel as if he/she roots for the real soccer team by the each one's soccer game executed in conjunction with the match date and time of the real soccer game. When the user gives more cheering points, the everybody's soccer team can gain more advantage and the user receives the greater reward, and thus it is possible to expedite the support operation by the user.

[5. Variations]

The present invention is not to be limited to the above described embodiment and can be changed as appropriate without departing from the spirit of the invention.

(1) For example, in the embodiment, a match pairing between users are set so as to coincide with the match pairing of the real soccer league, although the users may freely select their opponents. In this case, after the each one's soccer game is executed, the paring of the favorite teams of the user may be determined whether or not it coincides with the match pairing of the real soccer league, and if so, the cheering point may be provided to the user.

The game system S of variation (1) further includes means for receiving, before executing the second match (e.g., each one's soccer game), a selection of other user to be an opponent of the second match, from at least one of the plurality of users, and, in a case where the second match is executed, means for comparing the paring of the competition teams or the competition players (e.g., paring of favorite teams), which are associated with the users who play against each other in the second match, with the match pairing of the real or virtual sport game (e.g., match pairing of real soccer league). These means are implemented by, for example, the game executing unit 102.

Here, when the user plays the each one's soccer game, the opponent selecting screen 50 is displayed. Unlike the embodiment, other user displayed on the opponent selecting screen 50 is not determined based on the match pairing of the real soccer league and may be selected in a random manner. Alternatively, other user depending on the level of the user may be selected. The other user selected by the user from the opponent selecting screen 50 is selected as the opponent. Subsequently, the user data and the match pairing data are referred to, and the combination of the user's and the opponent's favorite teams is compared with the match pairing of the real soccer league.

The support operation permitting unit 116 of the variation (1) permits the user who has played in the second match to perform a support operation based on a comparison result of the comparing means and the match result of the second match (e.g., each one's soccer game). Here, in a case where the paring of the user's and the opponent's favorite teams corresponds to (coincides with) the match pairing of the real soccer league, the cheering point is provided to the user in order to permit the user to perform the support operation.

According to the variation (1), if the each one's soccer game in conjunction with the match pairing of the real soccer league is executed, it is possible to provide the user with the cheering point.

(2) In the embodiment, for example, the case is discussed in which the each one's soccer game is held only during the period corresponding to the match date and time of the real soccer league, although the each one's soccer game may be set as always executable. In this case, a user may receive a cheering point if the time point at which the user executes the each one's soccer game is within the period corresponding to the match date and time of the real soccer league.

The game system S of variation (2) includes means for determining whether or not the second match (e.g., each one's soccer game) is executed by the second match executing unit 110 in a period indicated by the date and time data. This determining means is implemented by, for example, the game executing unit 102. When the each one's soccer game is executed, the date and time data is referred to in order to determine whether or not the present time is within a target period of the match.

The support operation permitting unit 116 of variation (2) permits the user who has played in the second match to perform a support operation based on the result of the determining means and the match result of the second match (e.g., each one's soccer game). When the each one's soccer game is executed within a target period of the match, the cheering point is provided to the user.

According to variation (2), when the each one's soccer game is executed at the date and time in conjunction with the date and time of the match pairing of the real soccer league, it is possible to provide the user with the cheering point.

(3) In the embodiment, for example, the case is discussed in which the game parameter is changed according to a comparison result of the cheering points provided to the everybody's soccer teams. However, the game parameter may be changed according to the absolute quantity of the cheering points, not the relative quantity of the cheering points, in order to determine the degree of advantage/disadvantage.

Figure 17:
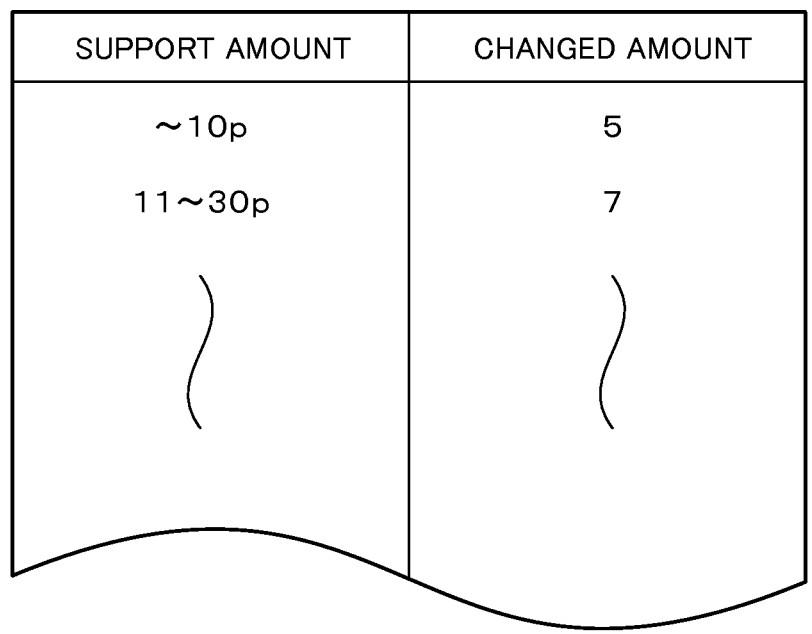
FIG. 17 A figure showing an example of storing data in which a support amount is associated with a changed amount of a game parameter.

FIG. 17 is a figure showing an example of storing data in which the support amount is associated with the changed amount of the game parameter. The data is stored in the game data storing unit 100. As shown in FIG. 17, the support amount condition relating to the support amount and information on increased or decreased amount of the game parameter are stored in association with each other. The support amount condition is the same as described in the embodiment. As shown in FIG. 17, when the cheering points given to the everybody's soccer team is increased, the changed amount of the game parameter is increased.

Here, the data is explained as tabular data, but may be in a numerical expression format described in the game program. That is, the data may be in a numerical expression format in which the number of the total cheering points of the everybody's soccer team is substituted, and then the changed amount of the game parameter is calculated.

The game parameter changing unit 122 of variation (3) includes means for obtaining the changed amount of the game parameter associated with the support amounts of plurality of items of game data, and changes the game parameter based on the obtained changed amount. The game parameter changing unit 122 changes the game parameter by the changed amount associated with the support amount condition satisfied by the number of the total cheering points provided to the everybody's soccer team.

According to variation (3), it is possible to determine the degree of advantage/disadvantage according to the absolute quantity of the cheering points provided to the everybody's soccer team.

(4) In the embodiment, for example, the parameter indicating the condition of the everybody's soccer team is described as an example of the game parameter that gives the everybody's soccer team an advantage or a disadvantage. However, the game parameter relating to the match result may be changed, or any other kind of game parameter specified by the game producer may be changed. For example, the parameter indicating the abilities of the soccer players belonging to the everybody's soccer team may be changed according to the support operation, or the game parameter indicating the score of the everybody's soccer game may be changed according to the support operation.

Further, in the embodiment, the case is discussed in which the game parameter changed by the game parameter changing unit 122 is included in the game data (data corresponding to everybody's soccer team), although the game parameter may be a game parameter that is different from game data. That is, in a case where the score of the game is changed as described above, the game parameter that is different from the game data is changed.

In the embodiment, the case is discussed in which the cheering point is provided to the everybody's soccer team to which the user wants to give an advantage, although a predetermined point may be provided to the everybody's soccer team to which the user wants to give a disadvantage in order to give an advantage to the opponent.

In the embodiment, the case is discussed in which "support operation" is giving the cheering point by the user, although the support operation is not limited to this example. The support operation may include any operation for a user to select the team to which the user wants to give an advantage or a disadvantage. For example, the support operation may include inputting a message of support to the everybody's soccer team, or simply selecting, on the screen, the everybody's soccer team that the user wants to support.

(5) In this embodiment, for example, the case is discussed in which programs and data are stored in the game data storing unit 100, although the programs and data may be obtained from external systems or devices (e.g., input devices) through a communication interface.

(6) Further, the present invention may be applicable to all the match games, and to game systems that execute games other than a soccer game. For example, the present invention may be applicable to sports games other than the soccer. In a case where the present invention is applied to a baseball game, users give cheering points to a match between the baseball teams (everybody's baseball team). Depending on the result of the match, a reward is provided to each user who has given the cheering point. In this case, similarly to the embodiment and the variations mentioned above, the match pairing and the match date and time of the baseball game may be in conjunction with a match pairing and a match date and time of a real-world professional baseball game. Other than this, for example, the present invention may be applicable to a game device that executes a game in which players play against each other using a plurality of cards. That is, in the embodiment, the case is discussed in which the game data is game character data, although the game data may be game card data.

(7) In the embodiment, for example, the case is discussed in which the server device 1 obtains information indicating the operations of the players from the game devices 10 and executes the game, although any of the game devices 10 may serve as a server. In this case, the game device 10 that serves as a server obtains information indicating the operations of the players from the other game devices 10, and executes various kinds of processing. In this case, functions of the game data storing unit 100, the game executing unit 102, the first match executing unit 104, the associating unit 106, the match setting unit 108, the second match executing unit 110, the match restricting unit 112, the restriction releasing unit 114, the support operation permitting unit 116, the support operation receiving unit 118, the support amount comparing unit 120, the game parameter changing unit 122, and the reward providing unit 124 are implemented by the game device 10 that serves as a server.

Further, the game devices 10 of the players may respectively store information indicating amounts of the support operations of the players. In this case, the game parameter changing unit 122 obtains the information from the respective game devices, thereby changing the game parameter.

(8) In the embodiment, the case is discussed in which the game system is implemented by the plurality of game devices. However, the game system may be implemented by one or more computers, and the devices that make up the game system are not limited to the example of the embodiment. For example, the game system may be implemented by a single game device. In this case, the display units and the controllers exist as many as the number of the players. The control unit of the game device obtains an operation condition of each controller to update various kinds of data. Subsequently, the control unit may generate a screen to be displayed on each player's display unit, and display the generated screen on each display unit. In this case, function blocks of the game system are implemented mainly by the control unit and the storing unit of the above described single game device.

The invention claimed is:

1. A game system for executing a public match based on a plurality of items of game data, comprising;
   a memory that store instruction; and
   a processor that is configured to execute the instruction stored in the memory to;
   execute a private match based on game data of a first user and second user;
   after the private match is completed, permit the first user and the second user to perform a support operation for the public match, based on a result of the private match;
   receive the support operation for the public match from the first user and the second user;
   change a game parameter relating to the public match based on the received support operation so as to make at least one of a plurality of items of game data more advantageous or disadvantageous than before receiving the support operation; and
   provide a reward to the first user and the second user who have performed the support operation.

2. The game system according to claim 1, wherein the processor is configured to:
   obtain data relating to a plurality of competition players or a plurality of competition teams of a real world or a virtual world;
   obtain match pairing data relating to a match pairing of the competition of the real world or the virtual world;
   associate each of the first and second user with at least one of the plurality of competition teams or the plurality of competition players;

determine the match pairing of the private match or a plurality of candidates of the match pairing of the private match such that the pairing of the competition teams or the competition players, which are associated with the respective first user and second user who play in the private match, corresponds to the match pairing of the competition of the real world or the virtual world, execute the private match based on the determined match pairing of the private match or the match pairing selected from the candidates of the match pairing of the private match.

3. The game system according to claim 1, wherein the processor is configured to:

obtain data relating to a plurality of competition players or a plurality of competition teams of a real world or a virtual world;

obtain match pairing data relating to a match pairing of the competition of the real world or the virtual world;

associate each the first user and the second user with at least one of the plurality of competition teams or the plurality of competition players;

receive, from at least one of the first user and the second user, a selection of third user to be an opponent in the private match, before the execution of the private match;

compare the pairing of the competition teams or the competition players, which are associated with the respective the first user and the second user who play in the private match, with the match pairing of the real world or the virtual world in a case where the private match is executed, permit the first user and the second user who have played in the private match to perform the support operation based on a comparison result of the comparing unit and a result of the private match.

4. The game system according to claim 1, wherein the processor is configured to:

store date and time data relating to a date and time of a match of a real world or a virtual world;

restrict the private match to be executed by the private match executing unit; and release a restriction of the private match during a term corresponding to the date and time indicated by the date and time data.

5. The game system according to claim 1, wherein the processor is configured to:

store date and time data relating to a date and time of a match of a real world or a virtual world;

determine whether or not the private match is executed by the private match executing unit during a term corresponding to the date and time indicated by the date and time data, and permit the first user and the second user who have played in the private match to perform a support operation based on a determination result of the determining unit and a result of the private match.

6. The game system according to claim 1, wherein the processor is configured to:

obtain a support amount of the plurality of items of game data, obtain data from a storage that stores data in which the support amount is associated with a changed amount of the game parameter, obtain the changed amount of the game parameter associated with the support amount of the plurality of items of game data, and changes the game parameter based on the obtained changed amount.

7. The game system according to claim 1, wherein the processor is configured:

obtain a support amount of the plurality of items of game data;

compare the support amount of the respective plurality of items of game data, change the game parameter based on a comparison result of the comparing unit.

8. The game system according to claim 1, wherein the processor is configured to:

obtain a support amount of the plurality of items of game data;

obtain data from a storage that stores data in which the support amount is associated with content of the reward to be provided to the first and second user, and obtain the content of the reward associated with the support amount of the plurality of items of game data, and provides the obtained content of the reward to the first user and second user who have performed the support operation to the plurality of items of game data.

9. A server device for executing a public match based on a plurality of items of game data, comprising:

a memory that stores instructions, and a processor that is configured to execute the instructions stored in the memory to:

execute a private match based on game data of a first user and a second user, after the private match is completed, permit the first user and the second user to perform a support operation for the public match, based on a result of the private match;

receive the support operation for the public match from the first user and the second user;

change a game parameter relating to the public match based on the received support operation so as to make at least one of a plurality of items of game data more advantageous or disadvantageous than before receiving the support operation; and provide a reward to the first user and the second user who have performed the support operation.

10. A method for controlling a server device that executes a public match based on a plurality of items of game data, the method comprising:

receiving a support operation for the public match from the first user and the second user, changing a game parameter relating to the public match based on the received support operation so as to make at least one of a plurality of items of game data more advantageous or disadvantageous than before receiving the support operation, and providing a reward to the first user and the second user who have performed the support operation.

11. A non-transitory computer-readable information storage medium for storing a program for causing a computer, which executes a public match based on a plurality of items of game data, to perform a function of:

receiving a support operation for the public match from the first user and the second user;

changing a game parameter relating to the public match based on the received support operation so as to make at least one of a plurality of items of game data more advantageous or disadvantageous than before receiving the support operation; and providing a reward to the first user and the second user who have performed the support operation.

* * * * *